US006954593B1

(12) United States Patent
Fuse

(10) Patent No.: US 6,954,593 B1
(45) Date of Patent: Oct. 11, 2005

(54) BURST OPTICAL COMMUNICATION APPARATUS

(75) Inventor: Masaru Fuse, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 799 days.

(21) Appl. No.: 09/695,883

(22) Filed: Oct. 26, 2000

(30) Foreign Application Priority Data

Oct. 29, 1999 (JP) ................................ 11-310200

(51) Int. Cl.$^7$ ......................... H04J 14/02; H04B 10/00
(52) U.S. Cl. ......................... 398/154; 398/91; 398/95; 398/196
(58) Field of Search ............................ 398/47, 49, 69, 398/75, 89, 91, 98, 99, 102, 159, 161, 166, 398/74, 76, 93, 95, 158, 196, 198

(56) References Cited

U.S. PATENT DOCUMENTS

| 4,267,590 | A | * | 5/1981 | Bosotti | 398/91 |
| 4,563,774 | A | * | 1/1986 | Gloge | 398/166 |
| 5,710,650 | A | * | 1/1998 | Dugan | 398/91 |
| 5,715,074 | A | * | 2/1998 | Netsu | 398/5 |
| 5,909,294 | A | * | 6/1999 | Doerr et al. | 298/138 |

OTHER PUBLICATIONS

Hyperspace Addressed Optical Access Architecture Using Active Arrayed Waveguide Gratings, F. Farjady, M. C. Parker, S. D. Walker, OECC '98, 15A2-2, 1998, pp. 316 & 317.

* cited by examiner

*Primary Examiner*—M. R. Sedighian
*Assistant Examiner*—Dalzid Singh
(74) *Attorney, Agent, or Firm*—Wenderoth, Lind & Ponack, L.L.P.

(57) ABSTRACT

First and second carrier modulators each modulate a carrier having a different frequency from each other with a baseband input signal. First and second variable wavelength optical modulators each convert the modulated signal into an optical signal having a first or second wavelength. An optical multiplexer multiplexes the optical signals, and sends a multiplexed signal to an optical transmission line. A wavelength separator individually outputs wavelength components of the multiplexed signal. First and second optical receivers each convert these wavelength components into an electrical signal. First and second filters each pass only the signal components of each different frequency. First and second burst demodulators each demodulate the modulated signal. With such a structure, a large-capacity optical communication apparatus which is capable of simultaneously using the same wavelength without requiring wavelength management in optical transmitting circuits can be achieved at a low cost.

2 Claims, 8 Drawing Sheets

FIRST BURST OPTICAL SIGNAL FROM FIRST VARIABLE WAVELENGTH MODULATOR

SECOND BURST OPTICAL SIGNAL FROM SECOND VARIABLE WAVELENGTH MODULATOR

OUTPUT OPTICAL SIGNAL FROM FIRST OUTPUT PORT OF WAVELENGTH SEPARATOR

OUTPUT OPTICAL SIGNAL FROM SECOND OUTPUT PORT OF WAVELENGTH SEPARATOR

BURST OPTICAL COMMUNICATION APPARATUS

BACKGROUND OF THE INVENTION

1. Field of the Invention

The present invention relates to optical communication apparatuses for transmitting a burst signal, and more specifically, to an optical communication apparatus for transmitting a burst signal by selectively switching signal paths by using a wavelength of the burst optical signal as address information.

2. Description of the Background Art

In one conventional art, a variable wavelength light source is provided as a light source to an optical communication circuit. This variable wavelength light source sends a burst-like optical signal by using the wavelength thereof as address information. Further, a wavelength separator having output terminals each corresponding to a different wavelength is provided on an optical transmission line. With this structure, a high-speed, large-capacity burst optical communication apparatus which is capable of spontaneously and quickly switching signal paths in an optical domain can be achieved. One example of the above-structured optical communication apparatus is disclosed in detail in "Hyperspace Addressed Optical Access Architecture using Active Arrayed Waveguide Gratings, F. Farjady, M. C. Parker, S. D. Walker, OECC98, 15A2-2, 1998.

FIG. 8 is a block diagram showing the structure of an optical communication apparatus according to the above-described background art. In FIG. 8, the optical communication apparatus includes an optical transmitting circuit 510, and first and second optical receiving circuits 5111 and 5112. Between the optical transmitting circuit 510 and the first and second optical receiving circuits 5111 and 5112, bidirectional burst (intermittent) transmission is achieved.

The optical communication apparatus further includes an optical transmission line 505 for transmitting an optical signal, and a wavelength separator 506 for separating the transmitted optical signal into signals which differ in wavelength from each other, and for outputting the signals to the corresponding first or second optical receiving circuits 5111 and 5112.

The optical transmitting circuit 510 includes a baseband signal source 501 for outputting a signal that carries data to be transmitted, and a variable wavelength optical modulation unit 502 for converting the received signal into an optical signal.

The first optical receiving circuit 5111 includes a first optical receiver 5071 for converting the received optical signal into an electrical signal. Similarly, the second optical receiving circuit 5112 includes a second optical receiver 5072 for converting the received optical signal into an electrical signal.

In the optical communication apparatus structured as described above, the baseband signal source 501 intermittently outputs, for example, a baseband digital signal. The variable wavelength optical modulation unit 502 includes a variable wavelength light source for outputting an optical signal of a predetermined wavelength. The variable wavelength optical modulation unit 502 modulates light that is outputted from the above-described variable wavelength light source with the baseband digital signal, and intermittently outputs a burst optical signal.

Here, the wavelength of the light that is outputted from the above-described variable wavelength light source is set to a first wavelength $\lambda 1$ during a period for transmitting the burst optical signal to the first optical receiver 5071, and is set to a second wavelength $\lambda 2$ during a period for transmitting the burst optical signal to the second optical receiver 5072.

The wavelength separator 506 is generally implemented as an AWG (Arrayed Wave Guide), and has first and second output ports. The wavelength separator 506 receives the optical signal that is transmitted through the optical transmission line 505, outputs signal components of the first wavelength from the first output port and signal components of the second wavelength from the second output port.

The first optical receiver 5071 is connected to the first output port of the wavelength separator 506, while the second optical receiver 5072 is connected to the second output port of the wavelength separator 506. The first optical receiver 5071 receives the optical signal of the first wavelength $\lambda 1$ that is intermittently outputted from the first output port of the wavelength separator 506, and then converts the optical signal into an electrical signal so as to be intermittently output therefrom. The second optical receiver 5072 receives the optical signal of the second wavelength $\lambda 2$ that is intermittently outputted from the second output port of the wavelength separator 506, and then converts the optical signal into an electrical signal so as to be intermittently output therefrom.

As stated above, in the conventional optical communication apparatus, the variable wavelength light source of the variable wavelength optical modulation unit 502 is provided as a light source of the optical transmitting circuit. The optical transmitting circuit sends a burst-like optical signal by using the wavelength thereof as address information. The wavelength separator 506 having output terminals each corresponding to a different wavelength of the output signal is provided on the optical transmission line. With such a structure, a high-speed, large-capacity burst optical communication apparatus which is capable of spontaneous and quick switching among signal transmission paths in an optical domain can be achieved.

However, such a conventional optical communication apparatus is provided only with a single optical transmitting circuit. This optical transmitting circuit uses a baseband digital signal as a transmission signal. Therefore, if a plurality of such optical transmitting circuits are provided and are simultaneously output optical signals to a single optical receiving circuit, a collision occurs among these optical signals, and therefore, these optical signals cannot be respectively detected. As a result, signal transmission cannot be achieved.

SUMMARY OF THE INVENTION

Therefore, an object of the present invention is to provide a large-capacity burst optical communication apparatus which is capable of preventing a collision among lights that are outputted from a plurality of optical transmitting circuits.

The present invention has the following features to solve the above-described problem.

A first aspect of the present invention is directed to an optical communication apparatus for transmitting an intermittent optical signal from a transmitting side to a receiving side by using wavelength information of the optical signal as an address. The apparatus of the first aspect comprises: at least two optical transmitting circuits for sending the intermittent optical signal; at least two optical receiving circuits for receiving the optical signal from each of the optical transmitting circuits; and an optical transfer circuit for connecting each of the optical transmitting circuits and each of the optical receiving circuits.

In the optical communication apparatus of the first aspect, each of the optical transmitting circuits intermittently sends burst optical signals which are outputted by taking a provided intermittent signal as an original signal so as to prevent a collision among the burst optical signals. In addition, the optical transfer circuit multiplexes the burst optical signals which are outputted from the optical transmitting circuits, separates the multiplexed burst optical signal in to optical signals for every predetermined wavelength corresponding to the optical receiving circuits, and individually outputs the separated optical signals from n output ports provided thereto. Further, each of the optical receiving circuits converts the optical signal that is outputted from a corresponding one of the output ports into an electrical signal, and intermittently outputs the electrical signal.

In the above-described first aspect, even with a plurality of optical transmitting circuits, a burst optical communication apparatus which is capable of preventing a collision among the wavelengths of lights outputted from these optical transmitting circuits can be achieved.

According to a second aspect of the present invention, in accordance with the first aspect, the optical communication apparatus further comprises a wavelength traffic manager. Each of the optical transmitting circuits includes a variable wavelength optical modulator for converting the intermittent signal into the burst optical signal, setting a wavelength of the burst optical signal to any one of at least two predetermined varying wavelengths corresponding to the optical receiving circuits, and intermittently sending the burst optical signal.

In addition, according to the second aspect, the wavelength traffic manager controls the wavelengths of the burst optical signals that are sent from the variable wavelength optical modulators so as to prevent the wavelengths from coinciding with one another.

Further, according to the second aspect, the optical transfer circuit includes: an optical multiplexer for multiplexing the burst optical signals that are outputted from the optical transmitting circuits, and outputting a multiplexed optical signal; a wavelength separator for separating the multiplexed optical signal that is inputted from the optical multiplexer into optical signals of the predetermined wavelengths corresponding to the optical receiving circuits, and individually outputting the separated optical signals from the n output ports, and each of the optical receiving circuits includes an optical receiver for converting the optical signal that is outputted from the output port corresponding thereto of the wavelength separator into the electrical signal, and intermittently outputting the electrical signal.

In the second aspect, the variable wavelength light source is used as a light source in each of the optical transmitting circuits The optical transmitting circuits each send a burst-like optical signal by using the wavelength of the burst-like optical signal as address information. Furthermore, the wavelength separator having output terminals each corresponding to a different wavelength is provided on the optical transmission line. Further, the wavelengths from the plurality of optical transmitting circuits are controlled so as not to coincide with one another. Thus, a burst optical communication apparatus which is capable of spontaneously and quickly switching signal transmission paths in an optical domain can be achieved.

According to a third aspect of the present invention, in accordance with first aspect, each of the optical transmitting circuits includes: a carrier modulator for modulating a carrier having a frequency which is unique to each of the optical transmitting circuits with the intermittent input signal so as to generate a burst modulated signal, and intermittently outputting the burst modulated signal: and a variable wavelength optical modulator for converting the burst modulated signal that is outputted from the carrier modulator into a burst optical signal, setting a wavelength of the burst optical signal to any one of at least two predetermined varying wavelengths corresponding to the optical receiving circuits, and intermittently sending the burst optical signal.

Further, according to the third aspect, the optical transfer circuit includes: an optical multiplexer for multiplexing the burst optical signals that are outputted from the optical transmitting circuits and outputting a multiplexed optical signal; and a wavelength separator for separating the multiplexed optical signal that is inputted from the optical multiplexer into optical signals of the predetermined wavelengths corresponding to the optical receiving circuits, and individually outputting the separated optical signals from the n output ports.

In addition, according to the third aspect, each of the optical receiving circuits includes; an optical receiver for converting the optical signal that is outputted from the output port corresponding thereto in the wavelength separator into an electrical signal, and intermittently outputting the electrical signal; a filter for receiving the electrical signal that is intermittently outputted from the optical receiver, selectively passing any one of the burst modulated signals from the at least two optical transmitting circuits based on the received electrical signal, and intermittently outputting the passed burst modulated signal; and a burst demodulator for demodulating the burst modulated signal that is intermittently outputted from the filter.

In the third aspect, the optical transmitting circuits are each assigned a different carrier frequency. The optical receiving circuits are each structured so as to select a desired frequency. Thus, separation and extraction of each transmission signal can be achieved even when a plurality of optical signals are simultaneously inputted from the optical transmitting circuits to any single optical receiving circuit. Moreover, burst communications can be achieved by a convenient structure without complicated wavelength management among the optical transmitting circuits.

According to a fourth aspect of the present invention, in accordance with the third aspect, the optical communication apparatus further comprises an optical sub-transmitting circuit, which includes: a carrier generator for multiplexing reference carriers that are equal in frequency to and have a predetermined relation in phase with the carriers which are unique to the optical transmitting circuits and, and outputting a multiplexed signal; an optical sub-modulator for converting the multiplexed signal that is outputted from the carrier generator into an optical signal having a predetermined wavelength which is different from the at least two predetermined varying wavelengths corresponding to the optical receiving circuits, and sending the optical signal.

In the fourth aspect, the optical multiplexer multiplexes the burst optical signals that are outputted from the optical transmitting circuits and the optical signal outputted from the optical sub-transmitting circuit, and outputs a multiplexed optical signal. Further, the wavelength separator separates the multiplexed optical signal that is outputted from the optical multiplexer into optical signals for each of the predetermined wavelengths corresponding to the at least two optical receiving circuits and an optical signal having a wavelength which is equal to the wavelength of the optical signal sent from the optical sub-modulator, and individually outputs the separated optical signals from the at least two output ports and a carrier output port provided thereto.

Further, according to the fourth aspect, each of the optical receiving circuits further includes: an optical sub-receiver for converting the optical signal that is outputted from the carrier output port of the wavelength separator into an electrical signal, and outputting the electrical signal; and a sub-filter for receiving the electrical signal that is outputted from the optical sub-receiver, selectively passing any one of the at least two reference carriers, and outputting the passed reference carrier.

In the fourth aspect, the burst demodulator demodulates the burst modulated signal that is intermittently outputted from the filter with reference to the reference carrier that is outputted from the sub-filter.

Further, in the fourth aspect, a carrier (an unmodulated signal) which is used in each optical transmitting circuit is transmitted from an additionally provided optical transmitting circuit to each optical receiving circuit as an optical signal of a dedicated wavelength. With reference to the carrier, each optical receiving circuit demodulates the signal that is transmitted from the optical transmitting circuit. Thus, the demodulation circuit for intermittently-transmitted modulated signals can be made simple in structure, and a large-capacity burst transmission can be achieved with such a simple structure.

According to a fifth aspect of the present invention, in accordance with the fourth aspect, the burst modulated signal is generated by any one of frequency modulation and phase modulation.

In the fifth aspect, a frequency-modulated signal or phase-modulated signal is used as a signal to be transmitted from each optical transmitting circuit. Thus, the CNR (carrier-to-noise ratio) can be improved, and as a result, higher-quality signal transmission can be achieved.

According to a sixth aspect of the present invention, in accordance with the fifth aspect, the burst demodulator carries out synchronous detection of the burst modulated signal that is intermittently outputted from the filter with reference to the reference carrier that is outputted from the filter.

In the sixth aspect, a frequency-modulated signal or phase-modulated signal is used as a signal to be transmitted from each optical transmitting circuit. Further, each optical receiving circuit demodulates the modulated signal by carrying out synchronous detection by using the carrier which is individually transmitted from each optical transmitting circuit. Thus, a higher-quality signal transmission can be achieved with a simple structure.

According to a seventh aspect of the present invention, in accordance with the third aspect, the carrier modulator modulates the carrier having the frequency which is unique to each of the optical transmitting circuits so as to generate the burst modulated signal, and intermittently outputs the burst modulated signal and the carrier.

Further, in the seventh aspect, each of the optical transmitting circuits further includes an optical sub-modulator for converting the carrier which is outputted from the carrier modulator into an optical signal having a predetermined wavelength that is different from at least two predetermined varying wavelengths corresponding to the optical receiving circuits, and for sending the optical signal. In addition, the optical multiplexer multiplexes the burst optical signals that are outputted from variable wavelength optical modulator included in each of the optical transmitting circuits and the optical signal from the optical sub-modulator, and outputs a multiplexed optical signal.

In the seventh aspect, the wavelength separator separates the multiplexed optical signal that is outputted from the optical multiplexer into optical signals for each of the predetermined wavelengths corresponding to the at least two optical receiving circuits and an optical signal having a wavelength which is equal to the wavelength of the optical signal that is sent from the optical sub-modulator, and individually outputs the separated optical signals from the at least two output ports and a carrier output port provided thereto.

Moreover, in the seventh aspect, each of the optical receiving circuits further includes: an optical sub-receiver for converting the optical signal that is outputted from the carrier output port of the wavelength separator into an electrical signal, and outputting the electrical signal; and a sub-filter for receiving the electrical signal that is outputted from the optical sub-receiver, selectively passing any one of the at least two reference carriers based on the received electrical signal, and outputting the passed reference carrier.

Further, in the seventh aspect, the burst demodulator demodulates the burst modulated signal that is intermittently outputted from the filter with reference to the reference carrier that is outputted from the sub-filter.

In the seventh aspect, each optical transmitting circuit is provided with an additional optical modulation circuit for transmitting a carrier (an unmodulated signal). The additional optical modulation circuit transmits the carrier as an optical signal of a dedicated wavelength. With reference to this carrier, each optical receiving circuit demodulates the signal that is transmitted from each optical transmitting circuit. Thus, a demodulation circuit for intermittently-transmitted modulated signals can be made simple in structure, and burst transmission can be achieved with such a simple structure.

According to an eighth aspect of the present invention, in accordance with the seventh aspect, the burst modulated signal is generated by any one of frequency modulation and phase modulation.

In the eighth aspect, a frequency-modulated signal or phase-modulated signal is used as a signal to be transmitted from each optical transmitting circuit. Thus, the CNR (carrier-to-noise ratio) can be improved, and as a result, a higher-quality signal transmission can be achieved.

According to a ninth aspect of the present invention, in accordance with the eighth aspect, the burst demodulator carries out a synchronous detection of the burst modulated signal that is intermittently outputted from the filter with reference to the reference carrier that is outputted from the sub-filter.

In the ninth aspect, a frequency-modulated signal or phase-modulated signal is used as a signal to be transmitted from each optical transmitting circuit. Further, each optical transmitting circuit demodulates the modulated signal by carrying out a synchronous detection by using the carrier separately transmitted from each optical transmitting circuit. Thus, a higher-quality signal transmission can be achieved with a simple structure.

According to a tenth aspect of the present invention, in accordance with the third aspect, each of the optical receiving circuits further includes a monitor for monitoring the electrical signal that is outputted from the optical receiver so as to determine whether the burst modulated signal that is outputted from each of the optical transmitting circuits is present or not, and, if present, controls the filter so as to selectively pass a predetermined burst modulated signal to be output therefrom.

In the tenth aspect, each optical receiving circuit keeps monitoring whether the burst modulated signal is transmitted from each optical transmitting circuit, and then adaptively controls the frequency band to be passed by the filter. Thus, a more efficient burst transmission can be achieved.

According to an eleventh aspect of the present invention, in accordance with the third aspect, the number of filter and the burst demodulator are provided according to the number of optical transmitting circuits in each of the optical receiving circuits, and further, each of the filters selectively passes a different one of the burst modulated signals from the at least two optical transmitting circuits, and intermittently outputs the passed burst modulated signal.

In the eleventh aspect, each optical receiving circuit is provided with at least two filters and at least two burst demodulators which correspond to the optical transmitting circuits. Thus, a larger-capacity burst transmission can be achieved.

These and other objects, features, aspects and advantages of the present invention will become more apparent from the following detailed description of the present invention when taken in conjunction with the accompanying drawings.

DETAILED DESCRIPTION OF THE INVENTION

First Embodiment

Figure 1:
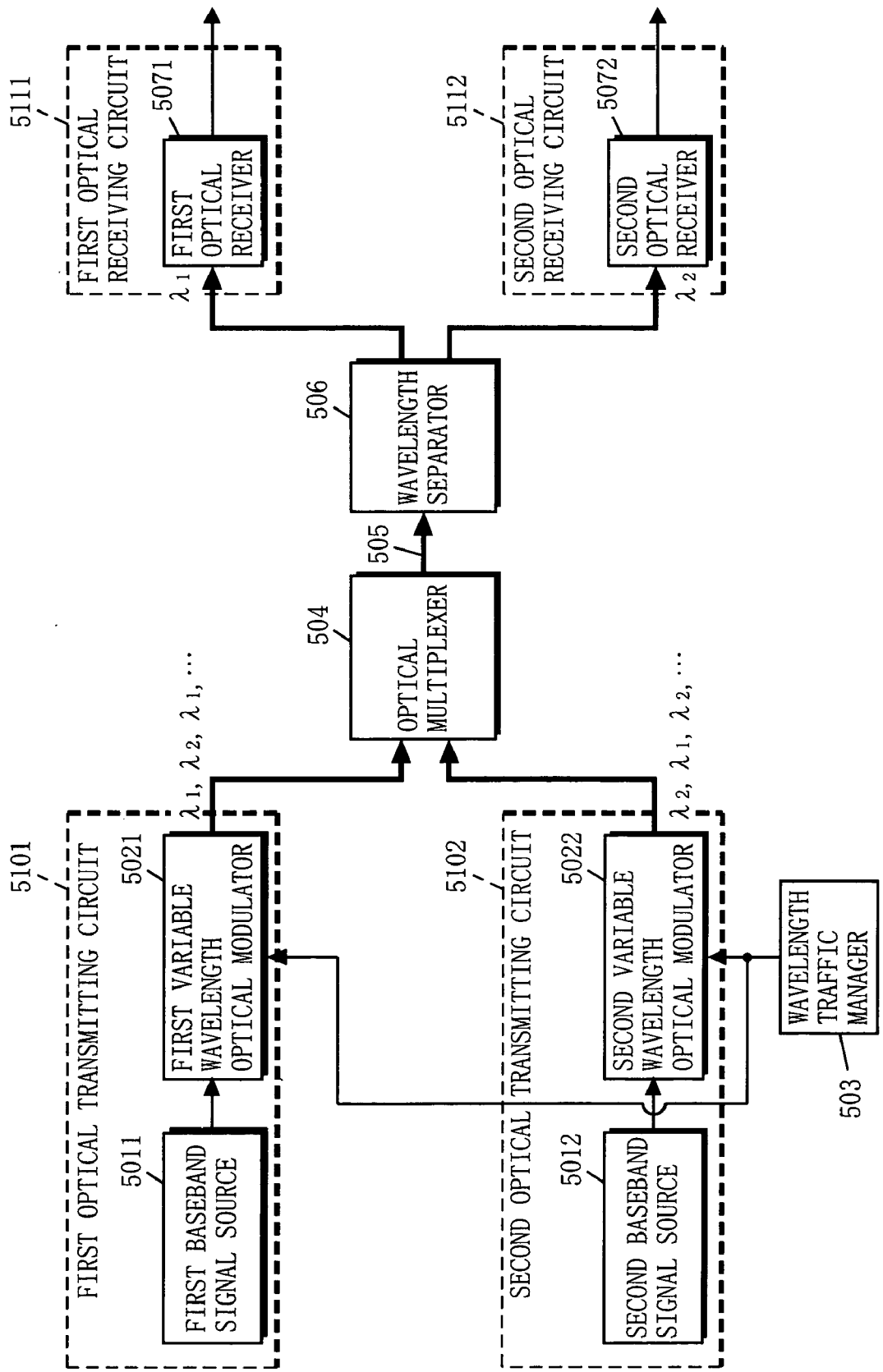
FIG. 1 is a block diagram showing the structure of an optical communication apparatus according to a first embodiment of the present invention.
Figure 8:
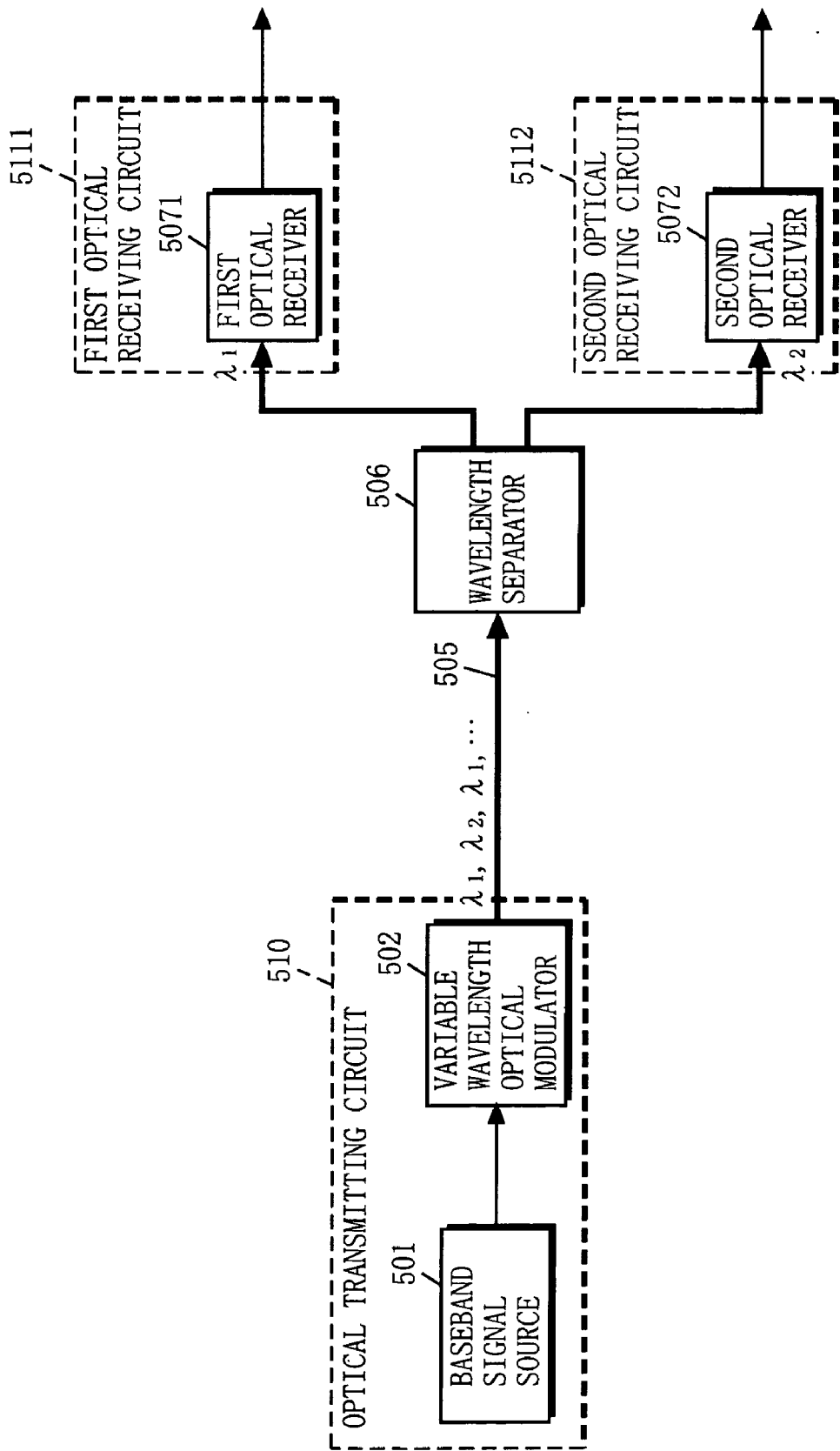
FIG. 8 is a block diagram showing the structure of a conventional optical communication apparatus.

FIG. 1 is a block diagram showing the structure of an optical communication apparatus according to a first embodiment of the present invention. In FIG. 1, the optical communication apparatus includes first and second optical transmitting circuits 5101 and 5102, and the first and second optical receiving circuits 5111 and 5112. Such a structure allows the optical communication apparatus to achieve bidirectional burst (intermittent) transmission between the first and second optical transmitting circuits 5101 and 5102 and the first and second optical receiving circuits 5111 and 5112. Note that, in FIG. 1, components that are identical in structure to those described with reference to FIG. 8 are provided with the same reference numerals.

The optical communication apparatus of the first embodiment further includes a wavelength traffic manager 503 for managing the wavelengths of optical signals respectively outputted from first and second variable wavelength optical modulators 5021 and 5022, an optical multiplexer 504 for multiplexing optical signals from the first and second variable wavelength optical modulators 5021 and 5022, and the wavelength separator 506 for separating the received signals by wavelength so as to output the separated signals to the first and second optical receiving circuits 5111 and 5112.

The first optical transmitting circuit 5101 includes a first baseband signal source 5011 for outputting a signal that carries data to be transmitted, and the first variable wavelength optical modulator 5021 for converting an input signal into an optical signal. Similarly, the second transmitter circuit 5102 includes a second baseband signal source 5012 for outputting a signal that carries data to be transmitted, and the second variable wavelength optical modulator 5022 for converting an input signal into an optical signal. The first and second optical receiving circuits 5111 and 5112 are identical in structure to those with the same reference numerals in the conventional optical communication apparatus shown in FIG. 8, and therefore are not described herein.

In the optical communication apparatus of the first embodiment structured as described above, each of the first and second baseband signal sources 5011 and 5012 intermittently outputs, for example, a baseband digital signal. Note that the first and second baseband signal sources 5011 and 5012 are just an example of sources for generating baseband signals. The first and second baseband signal sources 5011 and 5012 are omitted, as a matter of course, if baseband signals are externally provided from the outside of the optical communication apparatus, for example.

The first and second variable wavelength optical modulators 5021 and 5022 are provided so as to correspond to the first and second baseband signal sources 5011 and 5012, respectively, and each include a variable wavelength light source which is capable of varying the wavelength of the optical signal to be outputted. The first and second variable wavelength optical modulators 5021 and 5022 each modulate the light that is outputted from the corresponding variable wavelength light source with the baseband digital signal that is outputted from the corresponding baseband signal source, and intermittently output first and second burst optical signals, respectively.

Here, the wavelength of the output light from the variable wavelength light sources is set to a first wavelength $\lambda 1$ during a predetermined period for transmitting the burst optical signal to the first optical receiver 5071, and is set to a second wavelength $\lambda 2$ during a predetermined period for transmitting the burst optical signal to the second optical receiver 5072.

The optical multiplexer 504 multiplexes the first burst optical signal outputted from the first variable wavelength optical modulator 5021 and the second burst optical signal outputted from the second variable wavelength optical modulator 5022. The optical multiplexer 504 then sends the multiplexed optical signal to the optical transmission line 505. Note that the wavelength separator 506 and the first and second optical receivers 5071 and 5072 are identical in structure and operation to those in the conventional optical communication apparatus shown in FIG. 8, and therefore are not described herein.

The wavelength traffic manager 503 controls the first and second burst optical signals respectively outputted from the first and second variable wavelength optical modulators 5021 and 5022 so that the first and second burst optical signals differ in wavelength from each other. Such control prevents the first and second burst optical signals from being simultaneously inputted to the first or second optical receiver 5071 or 5072.

As stated above, in the optical communication apparatus, the variable wavelength light sources of the first and second variable wavelength optical modulators 5021 and 5022 are used as the light sources of the plurality of optical transmitting circuits 5101 and 5102. The optical transmitting circuits each send a burst-like optical signal by using the wavelength of the optical signal as address information to the optical transmission line on which a wavelength separator having output terminals each corresponding to a different wavelength is provided. With such a structure, the burst optical communication apparatus is capable of spontaneously and quickly switching signal transmission paths in an optical domain.

Second Embodiment

An optical communication apparatus according to a second embodiment of the present invention is the one that solves problems of the optical communication apparatus according to the first embodiment, which are now described first.

The optical communication apparatus according to the first embodiment uses a baseband digital signal as the transmission signal. Therefore, if optical signals from a plurality of optical transmitting circuits are simultaneously provided to a single optical receiving circuit, a collision occurs among the transmission signals, and therefore, these optical signals cannot be detected. To solve this problem, as stated above, the burst optical signals outputted from the optical transmitting circuits are managed so as not to be simultaneously identical in wavelength, that is, to always differ in wavelength from each other. However, this management makes the system structure complicated. Moreover, if the optical transmitting circuits are placed apart from each other, dedicated lines are required thereamong so as to communicate information for controlling the wavelengths. This requirement makes the system structure even more complicated.

Further, in the optical communication apparatus according to the first embodiment, the wavelength that is being used by one optical transmitting circuit cannot be used by the others. This restricts the total traffic-capacity of the optical communication apparatus.

Figure 2:
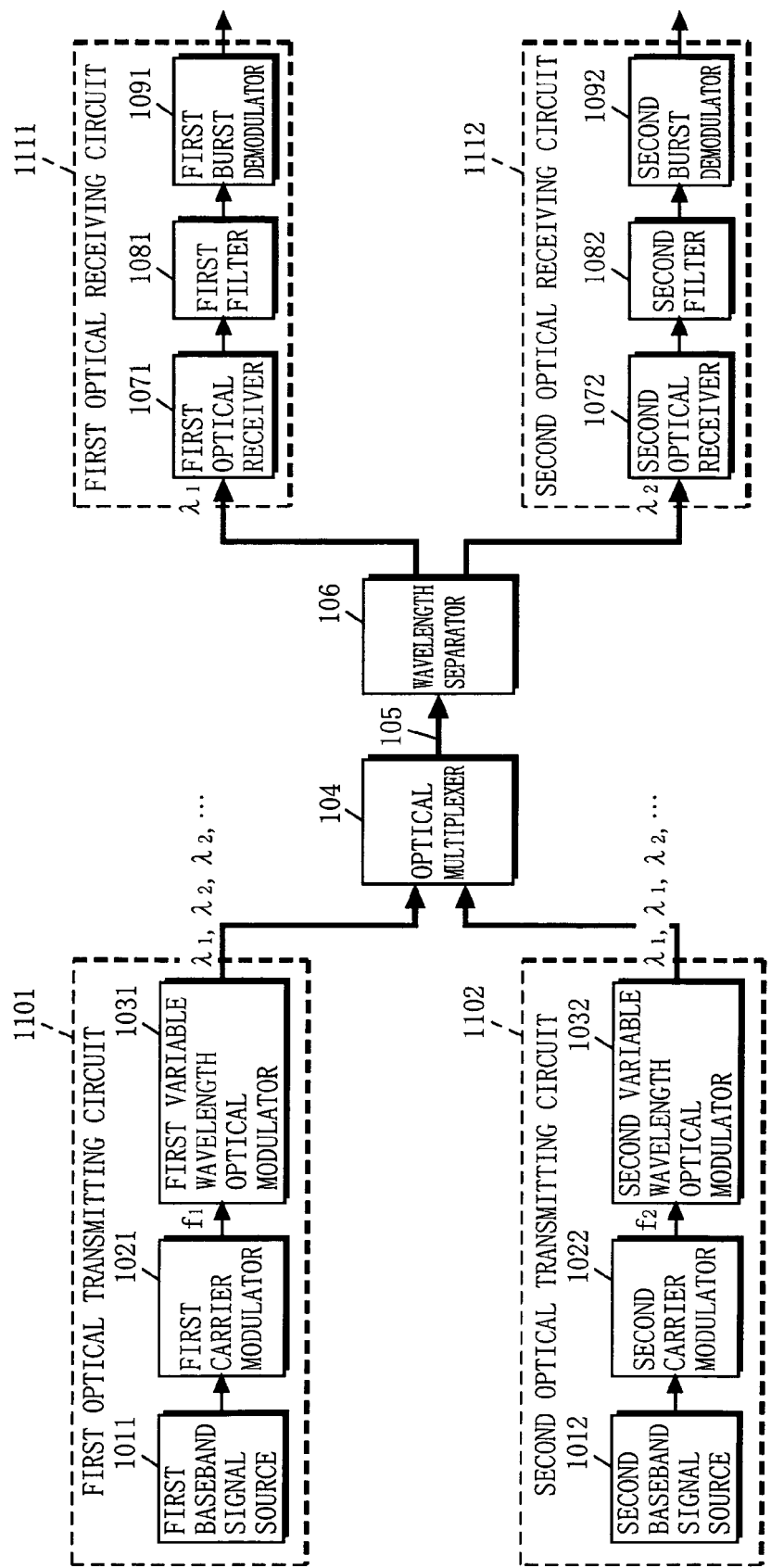
FIG. 2 is a block diagram showing the structure of an optical communication apparatus according to a second embodiment of the present invention.

Therefore, a large-capacity burst optical communication apparatus which is capable of simultaneously using the same wavelength without requiring wavelength management in a plurality of optical transmitting circuits is highly preferable. With reference to FIG. 2, the structure and operation of such an optical communication apparatus according to the second embodiment of the present invention is now described.

In FIG. 2, the optical communication apparatus of the present embodiment includes first and second optical transmitting circuits 1101 and 1102, and first and second optical receiving circuits 1111 and 1112.

The optical communication apparatus of the second embodiment further includes an optical multiplexer 104 for multiplexing lights outputted from the first and second optical transmitting circuits 1101 and 1102, an optical transmission line 105 for transmitting the multiplexed light, and a wavelength separator 106 for separating a received light from the optical transmission line 105.

The first optical transmitting circuit 1101 includes a first baseband signal source 1011 for outputting a baseband signal that carries data to be transmitted, a first carrier modulator 1021 for modulating a carrier with the outputted baseband signal, and a first variable wavelength optical modulator 1031 for converting an electrical signal from the first carrier modulator 1021 into an optical signal.

Similarly, the second transmitter circuit 1102 includes a second baseband signal source 1012 for outputting a baseband signal carrying data to be transmitted, a second carrier modulator 1022 for modulating a carrier with the outputted baseband signal, and a second variable wavelength optical modulator 1032 for converting an electrical signal from the second carrier modulator 1022 into an optical signal. Note that, as stated above, the first and second baseband signal sources 1011 and 1012 are omitted if baseband signals are intermittently inputted from the outside of the optical communication apparatus.

The first optical receiving circuit 1111 includes a first optical receiver 1071 for converting the received optical signal into an electrical signal, a first filter 1081 for passing only signal components of a predetermined frequency, and a first burst demodulator 1091 for demodulating the passed signal.

Similarly, the second optical receiving circuit 1112 includes a second optical receiver 1072 for converting the input optical signal into an electrical signal, a second filter 1082 for passing only signal components of a predetermined frequency, and a second burst demodulator 1092 for demodulating the passed signal.

First, the operation of the optical communication apparatus of the second embodiment shown in FIG. 2 will now be described. Each of the first and second baseband signal sources 1011 and 1012 intermittently outputs, typically, a baseband digital signal (pulse signal).

The first and second carrier modulators 1021 and 1022 are provided so as to correspond to the first and second baseband signal sources 1011 and 1012, respectively. The first and second carrier modulators 1021 and 1022 each modulate the carrier with the baseband digital signal that is intermittently outputted from the corresponding baseband signal source 1011, 1012, and intermittently output the digital modulated signal (for example, a 64QAM signal).

The first and second carrier modulators 1021 and 1022 respectively use a carrier having a predetermined first frequency f1 and a carrier having a predetermined second frequency f2 which are different from each other.

The first and second variable wavelength optical modulators 1031 and 1032 are provided so as to correspond to the first and second carrier modulators 1021 and 1022, respectively, and each of the first and second variable wavelength optical modulators 1031 and 1032 include a light source which is capable of varying the wavelength of the output light.

The first and second variable wavelength modulators 1031 and 1032 each modulate the light from the corresponding light source with the digital modulated signal outputted from the corresponding carrier modulator, and output first and second burst optical signals, respectively.

Figure 3A:
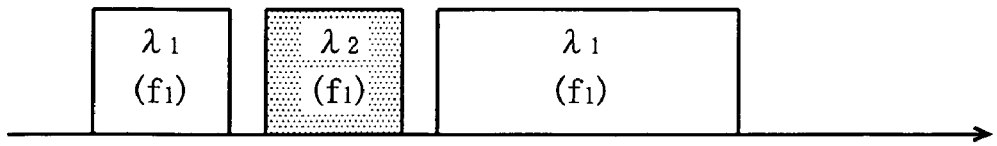
FIGS. 3a to 3d are each schematic diagrams for explaining a relationship between carrier frequencies and optical wavelengths of transmission signals in the optical communication apparatus according to the second embodiment of the present invention.
Figure 3B:

FIGS. 3a and 3b schematically show the structures of the first burst optical signal outputted from the first variable wavelength optical modulator 1031 and the second burst optical signal outputted from the second variable wavelength optical modulator 1032, respectively. In FIGS. 3a and 3b, λ1 represents the wavelength of the first optical signal, while λ2 represents the wavelength of the second optical signal. (f1) and (f2) each represent a carrier frequency of the digital modulated signal.

The optical multiplexer 104 multiplexes the first burst optical signal outputted from the first variable wavelength optical modulator 1031 and the second burst optical signal outputted from the second variable wavelength optical modulator 1032, and sends the multiplexed optical signal to the optical transmission line 105.

The wavelength separator 106 is implemented as an AWG, for example, having first and second output ports. Components of the predetermined first wavelength (λ1) that are included in the optical signal coming through the optical transmission line 105 are outputted from the first output port, while components of the predetermined second wavelength (λ2) that are included in the optical signal coming through the optical transmission line 105 are outputted from the second output port. Since the first and second burst optical signals are both intermittently outputted, the transmitted optical signal does not always include both components of the predetermined first wavelength (λ1) and the predetermined second wavelength (λ2).

Figure 3C:
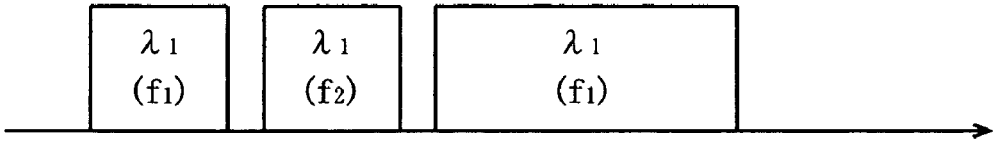
Figure 3D:

FIGS. 3c and 3d schematically show the structures of the optical signals outputted from the first and second output ports, respectively, of the wavelength separator 106, together with their wavelength and carrier frequencies.

The first optical receiver 1071 is connected to the first output port of the wavelength separator 106, while the second optical receiver 1072 is connected to the second output port of the wavelength. The first optical receiver 1071 receives the optical signal having the first wavelength (λ1) intermittently outputted from the first output port of the wavelength separator 106, and converts the received optical signal into an electrical signal for intermittent output. The second optical receiver 1072 receives the optical signal having the second wavelength (λ2) intermittently outputted from the second output port of the wavelength separator 106, and converts the received optical signal into an electrical signal for intermittent output.

The first and second filters 1081 and 1082 are provided so as to correspond to the first and second optical receivers 1071 and 1072, respectively. The first and second filters 1081 and 1082 each pass only the components of a signal having a predetermined frequency that is included in the electrical signal outputted from the corresponding optical receiver so as to output only the components of a signal having the predetermined frequency.

The first and second burst demodulators 1091 and 1092 are provided so as to correspond to the first and second filters 1081 and 1082, respectively. The first and second burst demodulators 1091 and 1092 each receive the digital modulated signal intermittently outputted from the corresponding filter and demodulate the digital modulated signal so as to output a digital demodulated signal.

The operation of the first and second variable wavelength optical modulators 1031 and 1032 will now be described in more detail. The first and second variable wavelength optical modulators 1031 and 1032 control the wavelength of the output optical signal based on where to transmit the signal, that is, the first or second optical receiving circuit 1111 or 1112.

More specifically, the first and second variable wavelength optical modulators 1031 and 1032 each set the wavelength of the optical signal to λ1 for transmitting the optical signal to the first optical receiving circuit 1111, while setting the wavelength of the optical signal to λ2 for transmitting the optical signal to the second optical receiving circuit 1112.

Such an operation of the first and second variable wavelength optical modulators 1031 and 1032 enables the wavelength separator 106 to spontaneously select a path for the optical signal as described above. Therefore, only the optical signal having the wavelength λ1 is transmitted to the first optical receiver 1071, while only the optical signal having the wavelength λ2 is transmitted to the second optical signal receiver 1072.

Next, the operation of the first and second filters 1081 and 1082 will now be described in more detail. The first and second filters 1081 and 1082 control a passband frequency based on from which optical transmitting circuit the optical receiving circuit should receive the signal, that is, the first or second optical transmitting circuit 1101 or 1102.

More specifically, the first and second filters 1081 and 1082 each set the passband frequency to f1 for receiving the signal from the first optical transmitting circuit 1101, while setting the passband frequency to f2 for receiving the signal from the second optical transmitting circuit 1102. Typically, the first and second filters 1081 and 1082 each selectively receive, at predetermined intervals, the signal from the first and second optical transmitting circuits 1101 and 1102.

Such an operation of the first and second filters 1081 and 1082 enables separation and selection from among the signals simultaneously provided from the first and second optical transmitting circuits 1101 and 1102 to a single optical receiving circuit 1111, 1112.

Now consider a case where the first and second optical transmitting circuits 1101 and 1102 simultaneously transmit signals to a single optical receiving circuit, for example, the first optical receiving circuit 1111. In such a case, the first filter 1081 that is included in the first optical receiving circuit 1111 selects any one of digital modulated signals, for example, a digital modulated signal outputted from the first optical transmitting circuit 1101. This digital modulated signal is demodulated by the burst demodulator 1091. Thus, signal transmission is established between the first optical transmitting circuit 1101 and the first optical receiving circuit 1111.

Therefore, the other digital modulated signal which is not selected by the first filter 1081, that is, the signal that was outputted from the second optical transmitting circuit 1102, is not used. Thus, signal transmission is not established between the second optical transmitting circuit 1102 and the first optical receiving circuit 1111.

In such a case, the second optical transmitting circuit 1102 re-transmits the abandoned digital modulated signal automatically or by responding to a notification from the first optical receiving circuit 1111 via a transmission line (not shown). With this operation, signal transmission can be established between the second optical transmitting circuit 1102 and the first optical receiving circuit 1111.

As described above, according to the second embodiment, each of the optical transmitting circuits is assigned different carrier frequencies, and the passband frequency in the optical receiving circuit is variably controlled according to the optical transmitting circuit from which the optical receiving circuit should receive information. Thus, information can be easily separated and extracted even if optical signals are simultaneously provided from a plurality of optical transmitting circuits to a single receiver circuit. Moreover, according to the second embodiment, complicated wavelength management among the optical transmitting circuits is not required. Therefore, the burst optical communication apparatus for performing high-speed, large-capacity optical information transmission and exchanges based on optical signal processing can be easily achieved.

Third Embodiment

Figure 4:
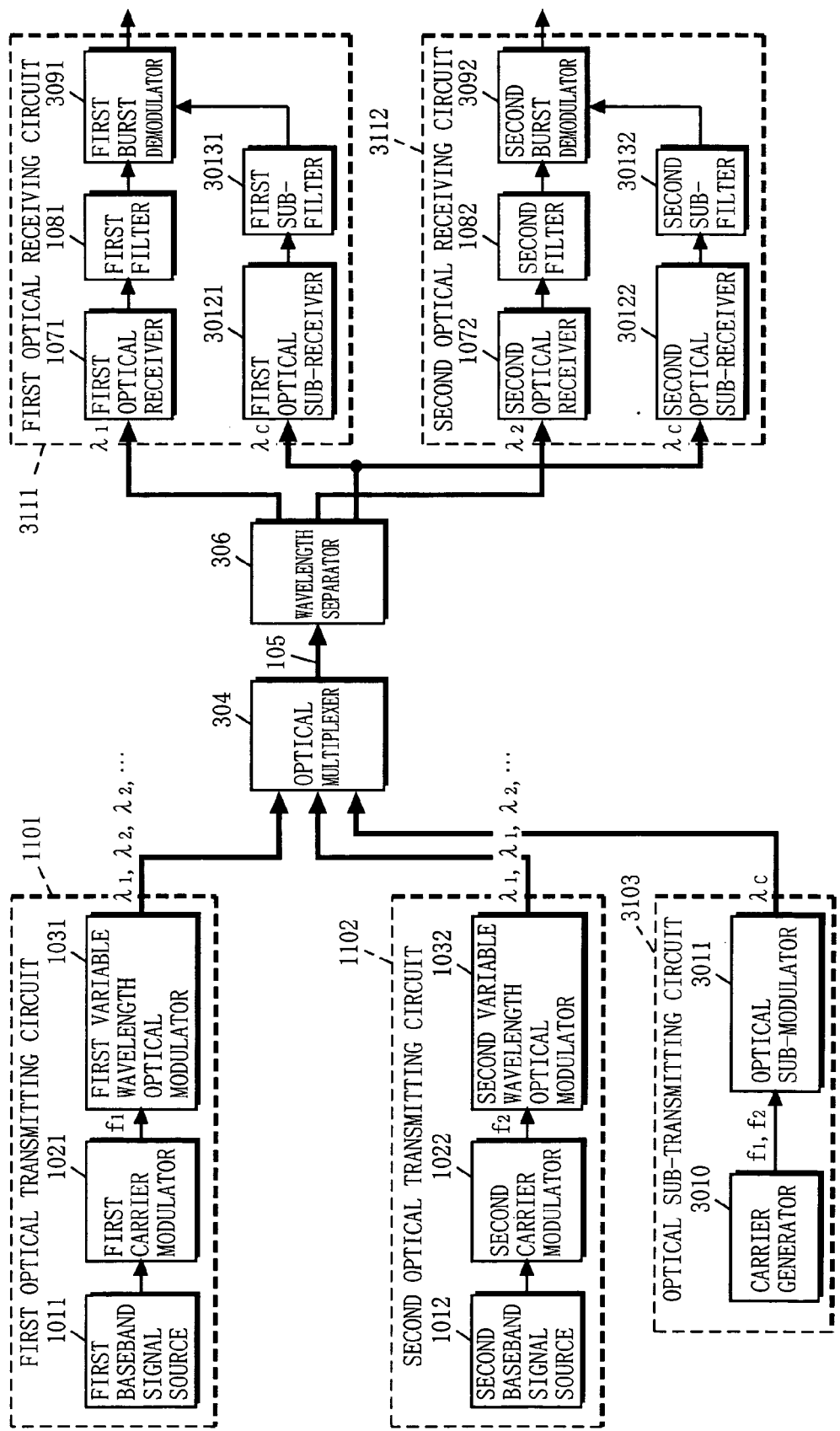
FIG. 4 is a block diagram showing an optical communication apparatus according to a third embodiment of the present invention.

With reference to FIG. 4, the structure of an optical communication apparatus according to a third embodiment of the present invention will now be described. In FIG. 4, the burst optical communication apparatus of the third embodiment includes the first and second optical transmitting circuits 1101 and 1102, an optical sub-transmitter circuit 3103, and first and second optical receiving circuits 3111 and 3112. Note that, in FIG. 4, components that are identical in structure to those described with reference to FIG. 2 are provided with the same reference numerals.

The optical communication apparatus of the third embodiment further includes an optical multiplexer 304 for multiplexing lights outputted from the first and second optical transmitting circuits 1101 and 1102 and the optical sub-transmitter circuit 3103, the optical transmission line 105 for transmitting the multiplexed light, and a wavelength separator 306 for separating the light from the optical transmission line 105.

The first and second optical transmitting circuits 1101 and 1102 in the optical communication apparatus of the third invention are identical in structure to those in the optical communication apparatus of the second embodiment, and therefore are not described herein.

The optical sub-transmitter circuit 3103 includes a carrier generator 3010 for simultaneously outputting signals that are equal in frequency to the carriers that are used for generating modulated signals which are outputted from the first and second carrier modulators 1021 and 1022, and an optical sub-modulator 3011 for converting the signal which is outputted from the carrier generator 3010 into an optical signal.

The first optical receiving circuit 3111 includes the first optical receiver 1071 and a first optical sub-receiver 30121 which are both for converting an input optical signal into an electrical signal, the first filter 1081 and a first sub-filter 30131 which are both for passing signal components of a predetermined frequency, and a first burst demodulator 3091 for demodulating an input signal that is outputted from the first filter 1081 with an input signal that is outputted from the first sub-filter 30131.

Similarly, the second optical receiving circuit 3112 includes the second optical receiver 1072 and a second optical sub-receiver 30122 which are both for converting an input optical signal into an electrical signal, the second filter 1082 and a second sub-filter 30132 which are both for passing signal components of a predetermined frequency, and a second burst demodulator 3092 for demodulating an input signal that is outputted from the second filter 1082 with an input signal that is outputted from the second sub-filter 30132.

The operation of the optical communication apparatus of the third embodiment shown in FIG. 4 will now be described. Since the structure of the optical communication apparatus of the third embodiment is similar to the optical communication apparatus of the second embodiment, only the differences therebetween are described below.

The carrier generator 3010 multiplexes signals that are equal in frequency to and have a predetermined relation in phase with all carriers which are used for generating digital modulated signals in the first and second carrier modulators 1021 and 1022, that is, carriers having frequencies f1 and f2.

The optical sub-modulator 3011 includes a light source for outputting a light having a predetermined third wavelength ($\lambda c$), and for converting the carriers having the frequencies f1 and f2 which are outputted from the carrier generator 3010 in to optical signals to be output therefrom. The outputted signals are not intermittent burst optical signals but instead are successive optical signals.

The optical multiplexer 304 multiplexes the first burst optical signal that is outputted from the first variable wavelength optical modulator 1031, the second burst optical signal that is outputted from the second variable wavelength optical modulator 1032, and the optical signal that is outputted from the optical sub-modulator 3011. The optical multiplexer 304 then sends the multiplexed signal to the optical transmission line 105.

The wavelength separator 306 is implemented as an AWG, for example, having first to third output ports. The wavelength separator 306 outputs components of the predetermined first wavelength ($\lambda 1$) from the first output port that are included in the optical signal which is transmitted through the optical transmission line 105 and outputs components of the predetermined second wavelength ($\lambda 2$) from the second output port that are included in the optical signal which is transmitted through the optical transmission line 105. Needless to say, the first and second burst optical signals are intermittently outputted, and therefore the transmitted optical signal does not always include components of both the first and second wavelengths ($\lambda 1, \lambda 2$). The wavelength separator 306 outputs components of a predetermined third wavelength ($\lambda c$) from the third output port that are always included in the transmitted optical signal.

The first and second optical sub-receivers 30121 and 30122 are each connected to the third output port of the wavelength separator 306. These optical sub-receivers 30121 and 30122 each receive the optical signal having the third wavelength ($\lambda c$) and convert the optical signal having the third wavelength ($\lambda c$) into an electrical signal.

The first and second sub-filters 30131 and 30132 are provided so as to correspond to the first and second optical sub-receivers 30121 and 30122, respectively. The first and second sub-filters 30131 and 30132 each selectively pass carriers having the predetermined frequency f1 or f2 from among the electrical signals that are outputted from the corresponding first and second optical sub-receiver 30121 and 30122.

The first and second burst demodulators 3091 and 3092 each demodulate the digital modulated signal that is intermittently outputted from the corresponding first and second filter 1081 amd 1082 with reference to the carrier that is also outputted from the corresponding first and second sub-filter 30131 and 30132 into a baseband digital signal.

The operation of the first and second sub-filters 30131 and 30132 will now be described in more detail. Similar to the first and second filters 1081 and 1082, the first and second sub-filters 30131 and 30132 each control the passband frequency depending on the optical transmitting circuit from which the corresponding first and second optical receiving circuit 3111 and 3112 should receive the signal, that is, the first or second optical transmitting circuit 1101, 1102.

More specifically, in order to receive the signal from the first optical transmitting circuit 1101, the first and second sub-filters 30131 and 30132 and their corresponding first and second filters 1081 and 1082 each set the passband frequency to f1. On the other hand, in order to receive the signal from the second optical transmitting circuit 1102, the first and second sub-filters 30131 and 30132 and their corresponding first and second filters 1081 and 1082 each set the passband frequency to f2. With this operation, the first and second sub-filters 30131 and 30132 each provide successively inputted carriers together with intermittently inputted digital modulated signals to each corresponding first and second burst demodulator 3091 and 3092 so as to cause easy, quick demodulation.

This demodulation process will now be described in more detail. If the above-described structure of the third embodiment is not used, the carrier which is required for demodulating the digital modulated signal is provided generally by an oscillation circuit which is built in the burst demodulator, for example, a PLL circuit. However, the digital modulated signal is only inputted intermittently. Therefore, a shift occurs in frequency and phase of the carrier that is generated by the PLL circuit, while the modulated signal is not inputted. Therefore, the carrier that is generated by the PLL circuit has to be correctly adjusted in frequency and phase when the modulated signal is inputted.

The intermittently-inputted digital modulated signal is, however, often very short. Therefore, in general, there is not enough time to adjust the frequency and phase. To make such an adjustment possible in this case, an extremely complicated structure is required for the optical communication apparatus.

Thus, according to the structure of the third embodiment in which signals that are similar to the carriers are successively provided, the intermittently-inputted digital modulated signal can be demodulated instantaneously with a more convenient structure.

As stated above, according to the third embodiment, each optical transmitting circuit successively transmits a signal which is similar to the carrier so as to generate a digital modulated signal to each optical receiving circuit. Therefore, the burst optical communication apparatus is capable of demodulating the intermittently-transmitted digital modulated signal more easily and quickly.

Fourth Embodiment

Figure 5:
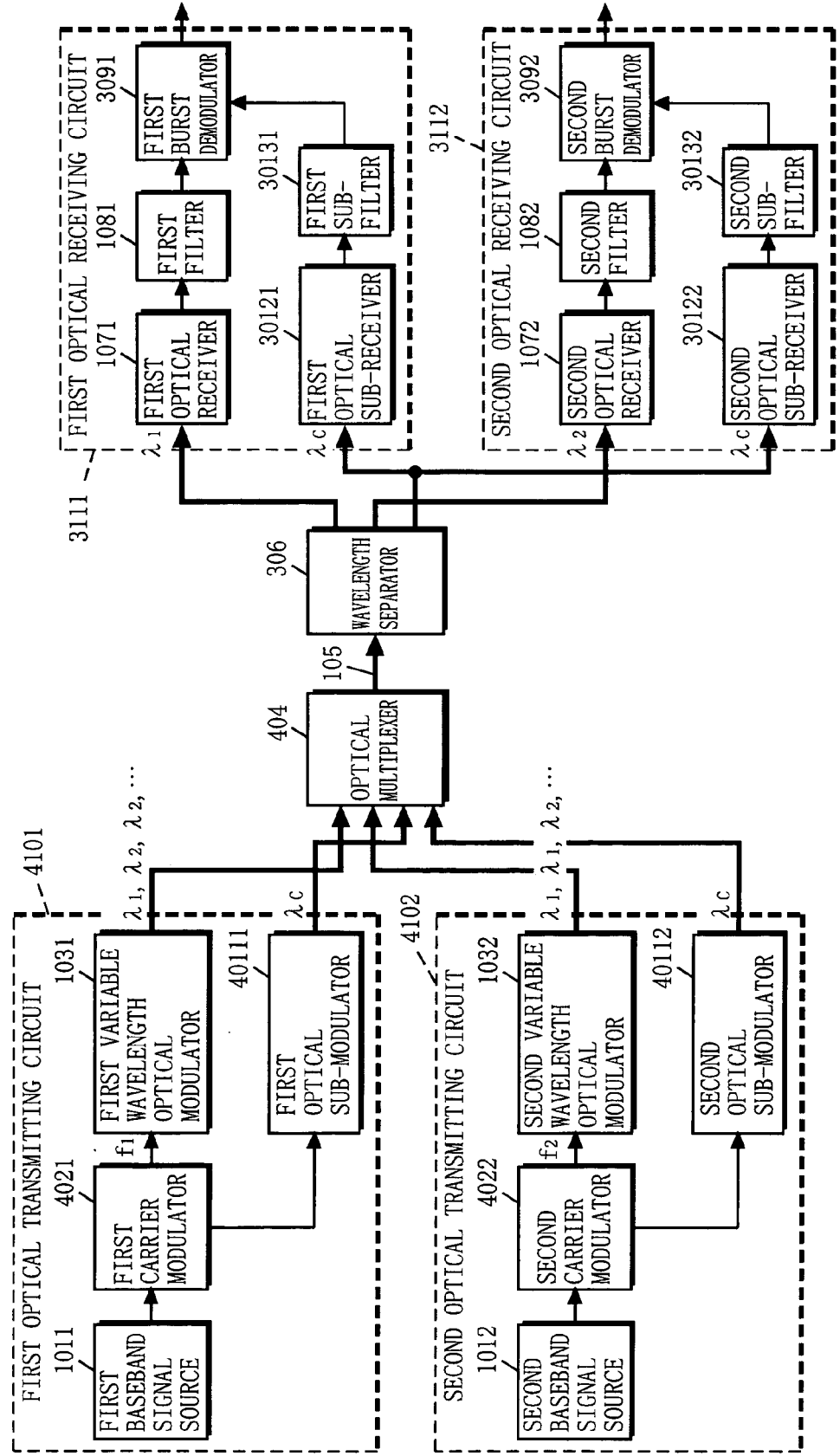
FIG. 5 is a block diagram showing an optical communication apparatus according to a fourth embodiment of the present invention.

With reference to FIG. 5, the structure of an optical communication apparatus according to a fourth embodiment of the present invention will now be described. In FIG. 5, the optical communication apparatus of the fourth embodiment of present invention includes the first and second optical transmitting circuits 4101 and 4102, and first and second optical receiving circuits 3111 and 3112. Note that, in FIG. 5, components of the optical communication apparatus of the fourth embodiment which are identical in structure to the components of the optical communication apparatus of the third embodiment described with reference to FIG. 4 are provided with the same reference numerals.

The optical communication apparatus of the fourth embodiment further includes an optical multiplexer 404 for multiplexing two signals that are outputted from the first optical transmitting circuit 4101 and two signals that are outputted from the second optical transmitting circuit 4102, the optical transmission line 105, and the wavelength separator 306 for separating an input light outputted from the optical transmission line 105.

The first optical transmitting circuit 4101 includes the first baseband signal source 1011 for outputting a baseband signal that carries data to be transmitted, the first carrier modulator 4021 for modulating a carrier with the baseband signal, a first variable wavelength optical modulator 1031 for converting an electrical signal that is outputted from the first carrier modulator 4021 into an optical signal, and a first optical sub-modulator 40111.

Similarly, the second optical transmitting circuit 4102 includes the second baseband signal source 1012 for outputting a baseband signal that carries data to be transmitted, a second carrier modulator 4022 for modulating a carrier with the baseband signal, the second variable wavelength optical modulator 1032 for converting an electrical signal that is outputted from the second carrier modulator 4022 into an optical signal, and a second optical sub-modulator 40112.

Note that the first and second optical receiving circuits 3111 and 3112 are identical in structure to those in the optical communication apparatus of the above-described third embodiment, and therefore are not described herein.

The operation of the optical communication apparatus according to the fourth embodiment shown in FIG. 5 will now be described. Since the optical communication apparatus of the fourth embodiment is similar in structure to the optical communication apparatus of the third embodiment, only the difference therebetween will now be described below. Note that, as stated above, the first and second baseband signal sources 1011 and 1012 can be omitted.

The first and second carrier modulators 4021 and 4022 are provided so as to correspond to the first and second baseband signal sources 1011 and 1012, respectively. The first and second carrier modulators 4021 and 4022 use carriers having a predetermined first frequency f1 and a predetermined second frequency f2, respectively, which are different from each other, so as to intermittently output digital modulated signals, and to also output unmodulated carriers.

The first and second optical sub-modulators 40111 and 40112 are provided so as to correspond to the first and second carrier modulators 4021 and 4022, respectively, and each of the first and second optical sub-modulators 40111 and 40112 includes a light source for outputting a light of the predetermined third wavelength (λc). The first and second optical sub-modulators 40111 and 40112 convert the carriers that are outputted from the first and second carrier modulators 4021 and 4022, respectively, into optical signals.

The optical multiplexer 404 multiplexes two burst optical signals which are outputted from the first and second variable wavelength optical modulators 1031 and 1032 and two optical signals which are outputted from the first and second optical sub-modulators 40111 and 40112 all together, and sends the multiplexed signal to the optical transmission line 105.

The operation of the receiving side in the fourth embodiment is similar to that in the third embodiment. However, the carriers that are inputted from the first and second sub-filters 30131 and 30132 to the first and second burst demodulators 3091 and 3092 are more correct in frequency and phase than those in the third embodiment.

More specifically, in the optical communication apparatus of the third embodiment, there is a high possibility that the signal that is outputted from the carrier generator 3010 which is included in the optical sub-transmitter circuit 3103 is slightly different in frequency and phase from the signals that are outputted from the first and second carrier modulators 1021 and 1022 because these signals are generated by different sources. On the other hand, in the optical communication apparatus of the fourth embodiment, the signals that are inputted to the first and second burst demodulators 3091 and 3092 are originally generated by the first and second carrier modulators 4021 and 4022, and therefore are exactly the same in frequency and phase as the carriers that are generated by the first and second carrier modulators 4021 and 4022.

Therefore, the optical communication apparatus of the fourth embodiment can carry out a more correct demodulation than that of the third embodiment, even though the structure is slightly complicated.

As stated above, according to the fourth embodiment, each optical transmitting circuit extracts a carrier for generating a digital modulated signal in each optical transmitting circuit, and outputs the carrier to each optical receiving circuit. Thus, a burst optical communication apparatus which is capable of easily and correctly demodulating an intermittently-transmitted digital modulated signal can be achieved.

Note that the optical communication apparatus of the fourth embodiment includes the first and second optical sub-modulators 40111 and 40112 to which the carriers from the first and second carrier modulators 4021 and 4022 are inputted, respectively. Alternatively, the optical communication apparatus of the fourth embodiment may be structured by a carrier multiplexer for multiplexing carriers that are outputted from the first and second carrier modulators 4021 and 4022 and a single optical sub-modulator for receiving the multiplexed signal from the carrier multiplexer. Similar to the optical communication apparatus of the third embodiment, this structure requires only a single optical sub-modulator, and therefore a more correct demodulation can be achieved with such a simple structure.

Fifth Embodiment

Figure 6:
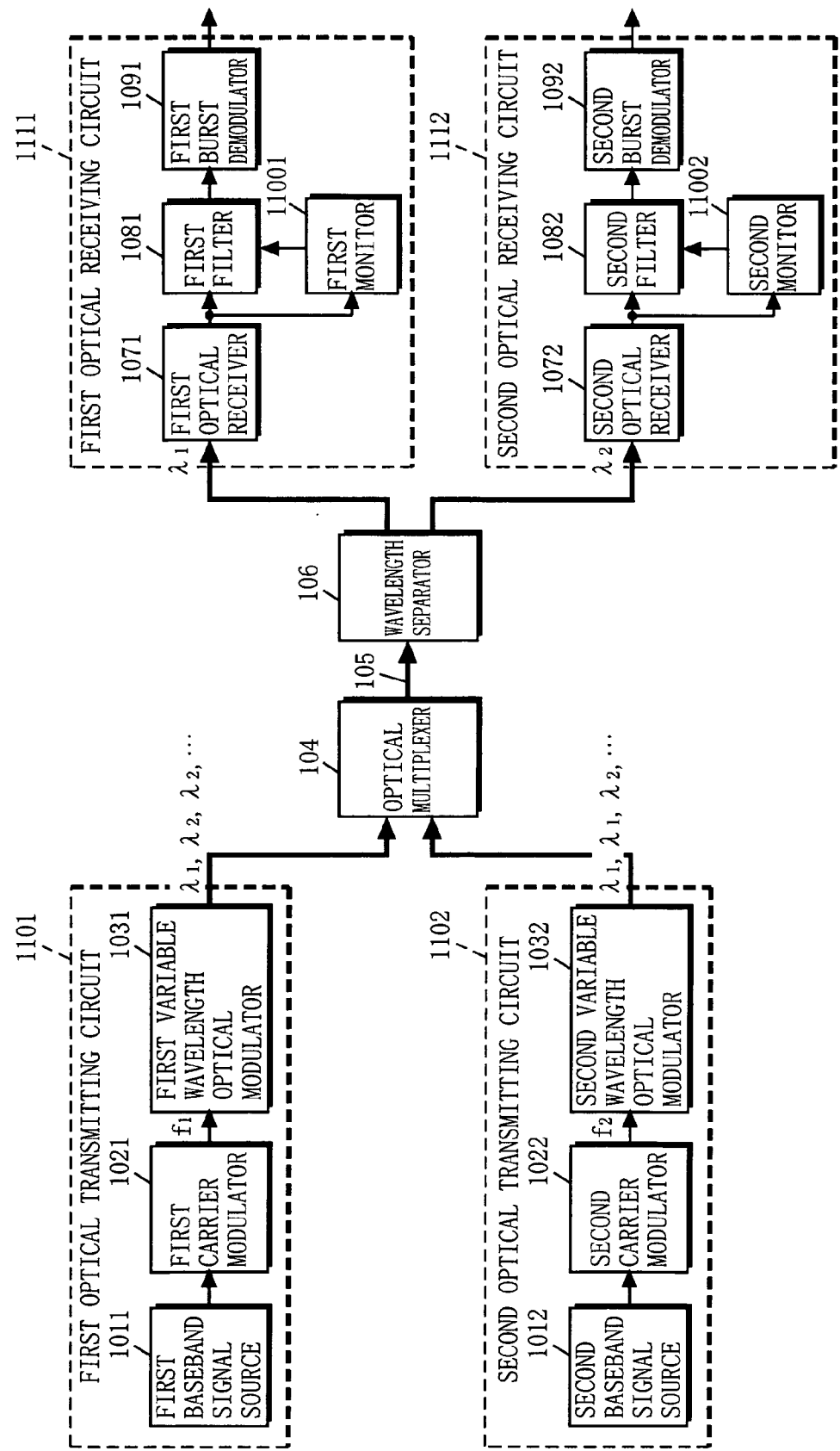
FIG. 6 is a block diagram showing an optical communication apparatus according to a fifth embodiment of the present invention.

With reference to FIG. 6, an optical communication apparatus according to a fifth embodiment of the present invention will now be described. In FIG. 6, the optical communication apparatus of the fifth embodiment includes the first and second optical transmitting circuits 1101 and 1102, and the first and second optical receiving circuits 1111 and 1112.

The optical communication apparatus of the fifth embodiment further includes the optical multiplexer 104 for multiplexing optical signals that are inputted from the first and second optical transmitting circuits 1101 and 1102, the optical transmission line 105 for transmitting the multiplexed optical signal, and the wavelength separator 106 for separating the optical signal that is inputted from the optical transmission line 105. Note that, in FIG. 6, components of the optical communication apparatus of the fifth embodiment which are identical in structure to the components of the optical communication apparatus of the second embodiment described with reference to FIG. 2 are provided with the same reference numerals.

The first and second optical transmitting circuits 1101 and 1102 are identical in structure to those in the second embodiment, and therefore are not described herein.

The first optical receiving circuit 1111 includes the first optical receiver 1071 for converting the input optical signal into an electrical signal, the first filter 1081 for passing only signal components having a predetermined frequency, a first monitor 11001 for monitoring an input signal that is outputted from the first optical receiver 1071 so as to control the first filter 1081, and the first burst demodulator 1091 for demodulating the passed input signal.

Similarly, the second optical receiving circuit 1112 includes the second optical receiver 1072 for converting the input optical signal into an electrical signal, the second filter 1082 for passing only signal components having a predetermined frequency, a second monitor 11002 for monitoring an input signal that is outputted from the second optical receiver 1072 so as to control the second filter 1082, and the second burst demodulator 1092 for demodulating the passed input signal.

The operation of the optical communication apparatus of the fifth embodiment shown in FIG. 6 will now be described. The optical communication apparatus of the fifth embodiment is similar in structure to that of the above-described second embodiment, and therefore only the differences therebetween will be described below.

The first monitor 11001 is provided so as to correspond to the first optical receiver 1071 and the first filter 1081, while the second monitor 11002 is provided so as to correspond to the second optical receiver 1072 and the second filter 1082. The first and second monitors 11001 and 11002 each keep monitoring electrical signals that are outputted from the corresponding optical receiver 1071, 1072. When detecting either one of a first digital modulated signal with a carrier having the frequency f1 and a second digital modulated signal with a carrier having the frequency f2, the first and second monitors 11001 and 11002 each control the corresponding filter 1081, 1082 so as to selectively pass the detected digital modulated signal.

For example, the first and second monitors 11001 and 11002 each keep monitoring the electrical signals that are outputted from the corresponding optical receiver 1071, 1072. When detecting that the corresponding optical receiver 1071, 1072 receives the optical signal from the first optical transmitting circuit 1101, the first and second monitors 11001 and 11002 each control the corresponding filter 1081, 1082 so as to selectively pass the first digital modulated signal with the carrier having the frequency f1. On the other hand, when detecting from the second optical transmitting circuit 1102, these monitors 11001 and 11002 each control the corresponding filter to selectively pass the second digital modulated signal with the carrier having the frequency f2. With such an operation of the first and second monitors 11001 and 11002, the first and second optical receiving circuits 111 and 1112 can each receive an appropriate signal depending on the optical signal that is received by the corresponding optical receiver 1071, 1072.

Moreover, with the operation of the first and second filters 1081 and 1082, separation and selection of the signals which are simultaneously inputted from the first and second optical transmitting circuits 1101 and 1102 to a single optical receiving circuit can be achieved.

As stated above, the optical communication apparatus according to the fifth embodiment is a modification in structure and operation of that according to the second embodiment. The optical communication apparatuses according to the third and fourth embodiments can be modified in a similar manner.

As described above, according to the fifth embodiment, the optical receiving circuits each monitor the digital modulated signals that are intermittently outputted from the optical transmitting circuits so as to control the corresponding filter. Thus, a more efficient burst optical communication apparatus can be achieved.

Sixth Embodiment

Figure 7:
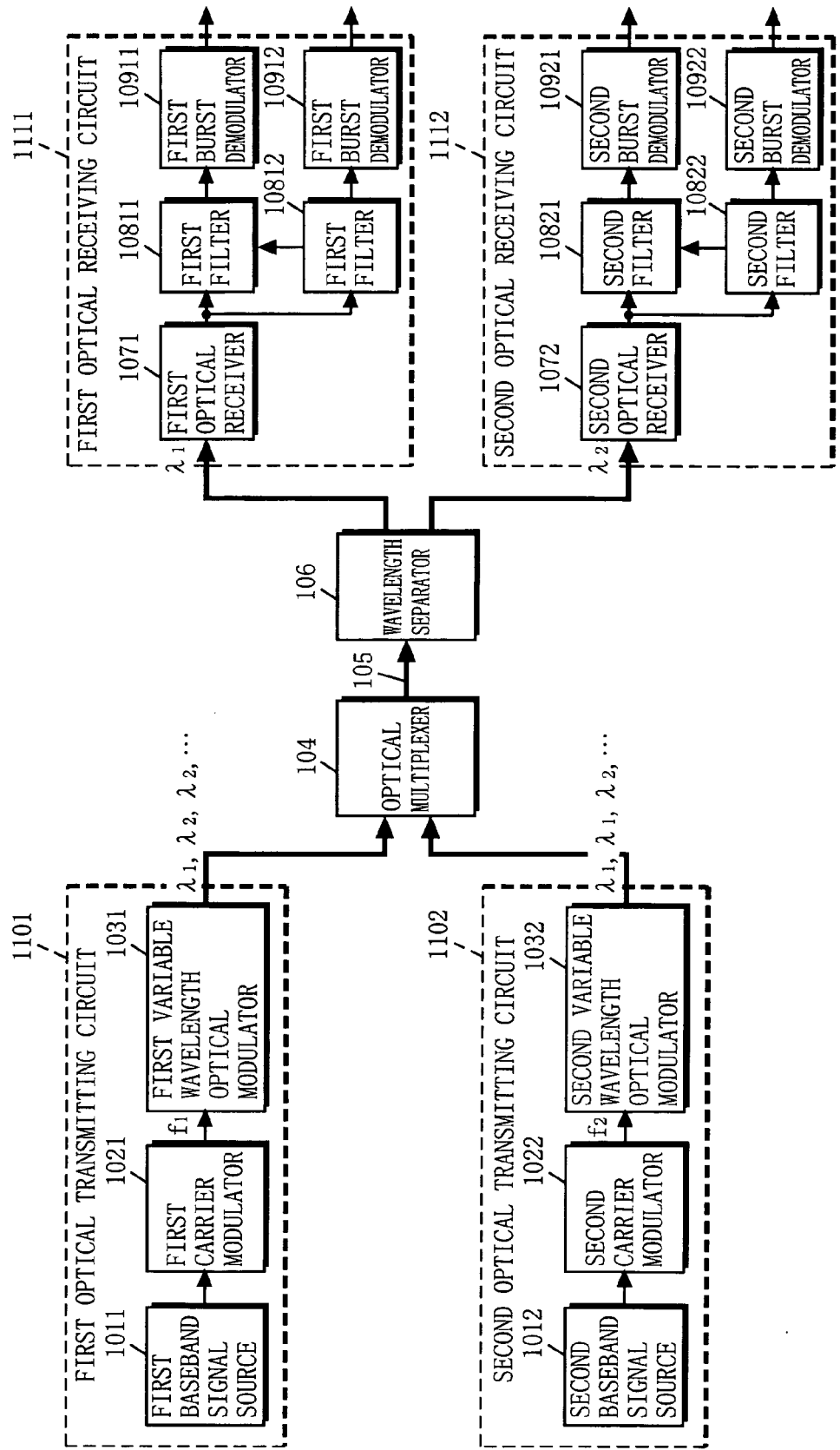
FIG. 7 is a block diagram showing an optical communication apparatus according to a sixth embodiment of the present invention.

With reference to FIG. 7, an optical communication apparatus according to a sixth embodiment of the present invention will now be described below. In FIG. 7, the optical communication apparatus of the sixth embodiment includes the first and second optical transmitting circuits 1101 and 1102, and the first and second optical receiving circuits 1111 and 1112. Note that, in FIG. 7, components of the optical communication apparatus of the sixth embodiment which are identical in structure to the components of the optical communication apparatus of the second embodiment described with reference to FIG. 2 are provided with the same reference numerals.

The optical communication apparatus of the sixth embodiment further includes the optical multiplexer 104 for multiplexing optical signals that are inputted from the first and second optical transmitting circuits 1101 and 1102, the optical transmission line 105 for transmitting the multiplexed optical signal, and the wavelength separator 106 for separating the optical signal that is inputted from the optical transmission line 105.

The first and second optical transmitting circuits 1101 and 1102 are identical in structure to those in the second embodiment, and therefore are not described herein.

The first optical receiving circuit 1111 includes the first optical receiver 1071 for converting the input optical signal into an electrical signal, two first filters 10811 and 10812 for passing only signal components which are varied in frequency, and two first burst demodulators 10911 and 10912 for demodulating the passed input signal.

Similarly, the second optical receiving circuit 1112 includes the second optical receiver 1072 for converting the input optical signal into an electrical signal, two second filters 10821 and 10822 for passing only signal components which are varied in frequency, and two second burst demodulators 10921 and 10922 for demodulating the passed input signal.

With reference to FIG. 7, the operation of the optical communication apparatus of the sixth embodiment will now be described. The optical communication apparatus according to the sixth embodiment is similar in structure to that according to the second embodiment, and therefore only the difference, therebetween will be described below.

In the first optical receiving circuit 1111, the first filter 10811 passes the first digital modulated signal having a carrier of the frequency f1. The passed signal is demodulated by the first burst demodulator 10911. On the other hand, the other first filter 10812 passes the second digital modulated signal having a carrier of the frequency f2. The passed signal is demodulated by the first burst demodulator 10912.

Similarly, in the second optical receiving circuit 1112, the second filter 10821 passes the first digital modulated signal having a carrier of the frequency f1. The passed signal is demodulated by the second burst demodulator 10921. On the other hand, the other second filter 10822 passes the second digital modulated signal having a carrier of the frequency f2. The passed signal is demodulated by the second burst demodulator 10922.

Therefore, in the first and second optical receiving circuits 1111 and 1112, two demodulators output demodulated signals that correspond to the first and second optical transmitting circuits 1101 and 1102. With such a structure, signals that are simultaneously inputted from the first and second optical transmitting circuits 1101 and 1102 to a single optical receiver can be both demodulated at the same time.

As stated above, the optical communication apparatus according to the sixth embodiment is a modification in structure and operation of that according to the second embodiment. The optical communication apparatuses according to the third and fourth embodiments can be modified in a similar manner.

As described above, according to the sixth embodiment, the number of filters and digital demodulators are provided according to as many optical transmitting circuits which are provided. Therefore, a burst optical communication apparatus which is larger in capacity can be achieved.

In the above-described embodiments, the operation of the optical communication apparatus has been described for a case where two optical transmitting circuits communicate with two optical receiving circuits. However, the number of optical transmitting and receiving circuits is not limited thereto, and the number of optical transmitting and receiving circuits may be more. Furthermore, the optical transmitting circuits are not necessarily equal in number to the optical receiving circuits.

In this case, the predetermined frequencies of the carriers for use in generating digital modulated signals in the optical transmitting circuits should differ from each other, and uniquely correspond to the optical transmitting circuits.

Still further, the wavelength of the optical signals transmitted from the optical transmitting circuits should vary based on the optical receiving circuit, and uniquely correspond to the optical receiving circuits. This allows the transmitting side to select the receiving side based on the wavelength, and the receiving side to select the transmitting side based on the carrier frequency.

Still further, as to all of the embodiments described above, any type of digital modulated signal can be used in the first and second carrier modulators. Here, frequency modulation and phase modulation are extremely advantageous as a modulation scheme for improving a CNR (carrier-to-noise ratio) on the transmission. To demodulate the modulated signal, however, complicated signal processing is required.

To avoid the above problem, in the above-described third and fourth embodiments, signals which are identical or similar to the carriers that are used for generating the modulated signal can be provided to the burst demodulators in the optical receiving circuits. Thus, demodulation can be easily carried out by, for example, synchronous detection of the modulated signals with reference to the provided signals.

While the present invention has been described in detail, the foregoing description is in all aspects illustrative and not restrictive. It is to be understood that numerous other modifications and variations can be devised without departing from the scope of the present invention.

What is claimed is:

1. An optical communication apparatus for transmitting an intermittent optical signal from a transmitting side to a receiving side by using wavelength information of the optical signal as an address, said apparatus comprising:
  at least two optical transmitting circuits operable to send the intermittent optical signal;
  at least two optical receiving circuits operable to receive the optical signal sent from each of said optical transmitting circuits, said at least two optical receiving circuits each being operable to receive a respective predetermined wavelength of the optical signal sent from each of said optical transmitting circuits; and
  an optical transfer circuit having at least two output ports operable to connect each of said optical transmitting circuits to each of said optical receiving circuits;
  wherein:
  each of said optical transmitting circuits is operable to provide a variable wavelength and intermittently send burst optical signals which are generated by varying the intermittent optical signal so as to prevent a collision among the generated burst optical signals due to a coincidence in wavelength or an overlap between time periods in which the burst optical signals are sent;

said optical transfer circuit is operable to multiplex the burst optical signals outputted from said optical transmitting circuits, to separate the multiplexed burst optical signal into optical signals for each predetermined wavelength corresponding to said optical receiving circuits, and to individually output the separated optical signals from said output ports; and each of said optical receiving circuits is operable to convert the optical signal outputted from a corresponding one of said output ports into an electrical signal, and to intermittently output the electrical signal.

2. The optical communication apparatus according to claim 1, further comprising a wavelength traffic manager, wherein:

each of said optical transmitting circuits includes a variable wavelength optical modulator operable to convert the intermittent signal into the burst optical signal, to set a wavelength of the burst signal to any one of at least two predetermined varying wavelengths corresponding to said optical receiving circuits, and to intermittently send the burst optical signal;

said wavelength traffic manager is operable to control the wavelengths of the burst optical signals sent from said variable wavelength optical modulators so as to prevent the wavelengths from coinciding with one another; and said optical transfer circuit includes an optical multiplexer operable to multiplex the burst optical signals outputted from said optical transmitting circuits and to output a multiplexed optical signal, a wavelength separator operable to separate the multiplexed optical signal inputted from said optical multiplexer into optical signals of the predetermined wavelengths corresponding to said optical receiving circuits, and to individually output the separated optical signals from said output ports, and each of said optical receiving circuits includes an optical receiver operable to convert the optical signal outputted from said output port corresponding thereto of said wavelength separator into the electrical signal, and to intermittently output the electrical signal.

* * * * *